United States Patent [19]

Cuozzo et al.

[11] Patent Number: 5,372,065
[45] Date of Patent: Dec. 13, 1994

[54] VALUE SELECTION MECHANISM INCLUDING MEANS FOR WEAKENING A DRIVE GEAR TO PERMIT DISTORTION THEREOF

[75] Inventors: Pasquale Cuozzo, Stamford; Richard A. Malin, Westport; Stephen J. Rigo; Alfred Spath, both of Stamford, all of Conn.

[73] Assignee: Pitney Bowes Inc., Stamford, Conn.

[21] Appl. No.: 85,382

[22] Filed: Jul. 2, 1993

[51] Int. Cl.5 .................................. B41L 47/46
[52] U.S. Cl. ........................... 101/93; 101/93.18; 101/93.28; 101/93.41; 101/106
[58] Field of Search .................. 101/91, 93, 77, 85, 101/86, 87, 74, 76, 92, 52, 45, , 110, 106–108, 376, 379, 377, 93.18, 93, 28, 93.41; 74/461, 411

[56] References Cited

U.S. PATENT DOCUMENTS

| | | | |
|---|---|---|---|
| 3,169,474 | 2/1965 | Howard | 101/110 |
| 3,682,378 | 8/1972 | Rouan et al. | 235/101 |
| 3,826,190 | 7/1974 | Zofchak | 101/45 |
| 3,851,580 | 12/1974 | Correll et al. | 101/45 |
| 4,050,374 | 9/1977 | Check, Jr. | 101/45 |
| 4,401,027 | 8/1983 | Hirano | 101/110 |
| 4,630,210 | 12/1986 | Salazar et al. | 364/167.01 |
| 4,649,814 | 3/1987 | Sette | 101/147 |
| 4,858,525 | 8/1989 | Hubbard et al. | 101/91 |
| 5,163,366 | 11/1992 | Gregoire | 101/91 |

FOREIGN PATENT DOCUMENTS

| | | | |
|---|---|---|---|
| 2714020 | 10/1978 | Germany | 74/461 |
| 4191553 | 7/1992 | Japan | 74/461 |

Primary Examiner—Edgar S. Burr
Assistant Examiner—Anthony H. Nguyen
Attorney, Agent, or Firm—Charles G. Parks, Jr.; Melvin J. Scolnick

[57] ABSTRACT

Value selection and printing apparatus comprising, structure for printing a value, the printing structure including a rotatable device and a drive shaft therefor, structure for selecting the value, the value selecting structure including a rack gear slidably movably connected to the device, the rack gear including a plurality of gear teeth formed therein, the value selecting structure including a drive gear and a first gear, the drive gear including gear teeth disposed in meshing engagement with the rack gear teeth, the first gear coaxially fixedly attached to the drive gear for rotation therewith and including first gear teeth, the value selecting structure including a value printing wheel, the printing wheel including a circumferentially-extending periphery and a plurality of printing fonts located at spaced intervals thereabout, the value selecting structure including a second gear coaxially fixedly attached to the printing wheel for rotation thereof, the second gear including gear teeth and disposed in meshing engagement with the first gear for rotation of the second gear and thus the print wheel in response to movement of the rack gear, and structure for weakening the drive gear against a force exerted against the print wheel which tends to disassociate the print wheel and second gear to cause the drive gear to distort in response to the force in a manner such that the drive gear jams in response to rotation thereof.

12 Claims, 2 Drawing Sheets

VALUE SELECTION MECHANISM INCLUDING MEANS FOR WEAKENING A DRIVE GEAR TO PERMIT DISTORTION THEREOF

This invention is generally concerned with a value selection mechanism and more particularly with a postage value selection mechanism including means for weakening a drive gear thereof.

BACKGROUND OF THE INVENTION

U.S. Pat. No. 3,682,378 for a Value Dispensing Mechanism, issued Aug. 8, 1962 to Rouan et. al. and assigned to the assignee of the present invention, discloses a rotary postage value selection mechanism including a plurality of longitudinally translatable rack gears which are individually connected for rotating an associated print wheel via an idler gear fixedly connected to the print wheel.

U.S. Pat. No. 4,050,374 for a Meter Setting Mechanism, issued Sep. 27, 1977 to Check, Jr. and assigned to the assignee of the present invention, discloses a mechanism for selecting postage values which are to be printed by a rotary postage meter. The drive shaft of the drum includes a plurality of selectable racks, each of which is slidably movable in engagement with a different pinion gear, connected to an associated print wheel within the drum, for selectively rotating the print wheel to dispose a printing element or font thereof at the outer periphery of the drum for printing purposes. The value selection mechanism includes a first stepper motor which is operable for selecting one of the racks, and a second stepper motor which is operable for actuating the selected rack for selectively rotating the desired printing element of its associated print wheel to the printing position thereof. An electronic control system (not shown) which is coupled to a keyboard for processing postage value entries made by an operator, selectively drives the respective stepper motors in response to keyboard entries.

Value selection mechanisms of the aforesaid types have from time-to-time become physically damaged with the result that one or more rack gears have become disassociated from an associated print wheel drive gear, with the result that the print wheels may be rotated independently thereof. Whereupon, a postage value can be printed which is different from that which has been selected by means of the associated rack gear. Although the occurrence of such physical damages are immediately apparent to a postage meter user, meters have been known to be continued to be used despite such a malfunction condition, in order to wrongfully print postage values without payment therefor. Of course, since postage meters are required to be physically inspected on a semi-annual basis, and more frequently when Postal Service inspectors, through internal postage indicia inspection controls and accounting practices, suspect that a postage meter is dispensing more postage than has currently been paid for, such physical damages have a short life span due to their inevitably early discovery. Nevertheless, any postage payment losses are rightfully of great concern to the Postal Service and to postage meter manufacturers. As a result, a series of experimental activities with postage meters have been conducted to determine the basic cause, if any, of disassociation of postage selecting racks and print wheels. And, it has been experimentally determined that the majority of the instances in which such disassociations occur are due to a sufficient force being exerted against the print wheel to separate the same from the drive train therefor. Accordingly:

an object of the invention is to provide means for weakening the drive train, between the rack and print wheel of a value setting mechanism, against a force exerted against the print wheel which tends to separate the print wheel from the drive train, in order to cause the drive train to jam in response to the force;

another object is to provide means for permitting distortion of a drive gear upon exertion of a force against a print wheel driven thereby; and another object is to provide rotary value selection and printing apparatus, including a print wheel drive gear which is weakened, against the exertion of a force against a print wheel which is sufficient to separate the print wheel and the drive gear, to permit the drive gear to distort, in response to the force, in a manner such that the drive gear becomes jammed against rotational movement thereof.

SUMMARY OF THE INVENTION

Value selection and printing apparatus comprising, means for printing a value, the printing means including a rotatable device and a drive shaft therefor, means for selecting the value, the value selecting means including a rack gear slidably movably connected to the device, the rack gear including a plurality of gear teeth formed therein, the value selecting means including a drive gear and a first gear, the drive gear including gear teeth disposed in meshing engagement with the rack gear teeth, the first gear coaxially fixedly attached to the drive gear for rotation therewith and including first gear teeth, the value selecting means including a value printing wheel, the printing wheel including a circumferentially-extending periphery and a plurality of printing fonts located at spaced intervals thereabout, the value selecting means including a second gear coaxially fixedly attached to the printing wheel for rotation thereof, the second gear including gear teeth and disposed in meshing engagement with the first gear for rotation of the second gear and thus the print wheel in response to movement of the rack gear, and means for weakening the drive gear against a force exerted against the print wheel which tends to disassociate the print wheel and second gear to cause the drive gear to distort in response to the force in a manner such that the drive gear jams in response to rotation thereof.

BRIEF DESCRIPTION OF THE DRAWINGS

As shown in the drawings wherein like reference numerals designate like or corresponding parts throughout the several views.

DESCRIPTION OF THE PREFERRED EMBODIMENTS

Figure 1:
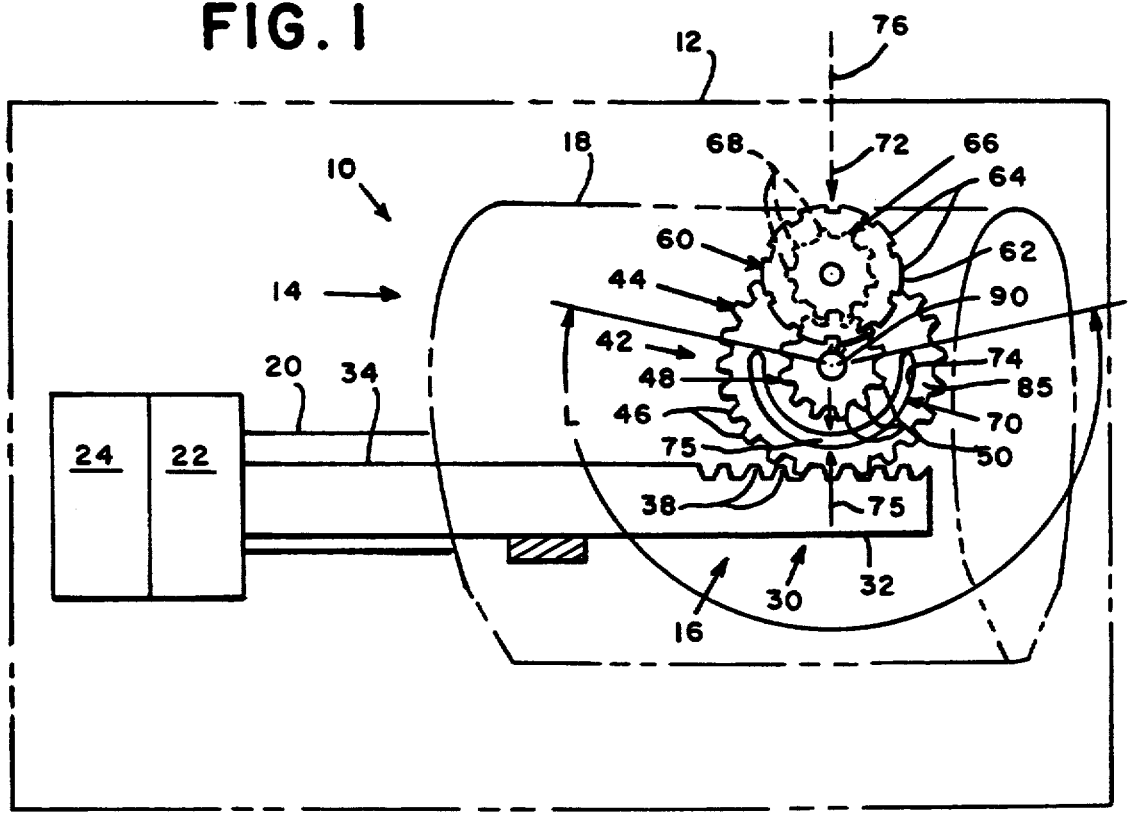
FIG. 1 is a schematic view of a first embodiment of a rotary postage printing device, or equivalent structure, represented by a drum and a drive shaft therefor, including a value selection rack gear, print wheel and drive train therebetween, wherein the drive train includes a drive gear, driven by the rack gear, and includes a coaxially connected first gear disposed in meshing engagement with a second gear fixed to the print wheel for rotation thereof.

As shown in FIG. 1, a value selection and printing mechanism 10 of the type which is used in a postage meter 12, generally includes value printing structure 14 and postage value selecting structure 16.

The postage value printing structure 14 (FIG. 1) includes a rotatable printing device or equivalent structure including and represented by a drum 18, and an elongate, hollow, tubular, drive shaft 20 for the drum 18. In addition, the printing structure 14 includes a conventional source of supply 22 of motive power, such as a conventional single revolution clutch or d.c. motor, which is conventionally connected between a suitable control system 24 and the drive shaft 20 for rotation thereof under the control of the control system 24. A more detailed description of the aforesaid typical printing structure 14 may be found one or more of the aforesaid U.S. Pat. Nos. 3,682,378 and 4,050,374, or in other U.S. Patents referred to therein.

The postage value selecting structure 16 (FIG. 1), as modified according to the invention, preferably includes an elongate, rack gear 30 which is conventionally slidably movably connected to printing drum 18 so as to extend within and longitudinally of the length of the drive shaft 20. The rack gear 30 includes one end portion 32 which is longitudinally movable internally of the printing drum 18, and the other end portion 34 which is longitudinally movable externally of the drum 18. The internally movable portion 32 includes a plurality of gear teeth 38 formed therein longitudinally of the length thereof. And the external portion 34 is conventionally constructed and arranged for connection to the motive power supply 22 for movement of the rack gear 30 under the control of the control system 24. Moreover, the postage value selecting structure 16 includes a compound gear 42, including a print wheel drive gear 44, having gear teeth 46, which is disposed in meshing engagement with the rack gear teeth 38, and including a first idler gear 48, having gear teeth 50 and which is conventionally coaxially fixedly attached to the drive gear 44 for rotation therewith. In addition, the postage value selecting structure 16 includes a postage value print wheel 60. The print wheel 60 has a circumferentially-extending periphery 62, and includes a plurality of printing elements or fonts 64 which are located at spaced intervals about the periphery 62. In the postage value printing environment herein discussed, the printing fonts 64 include, for example, the numerals 1 through 9, and include the numeral zero or a graphic symbol. Accordingly, the print wheel 60 normally includes ten printing fonts 64 substantially equidistantly spaced about the periphery of print wheel 60. In addition, the print wheel 60 includes a second idler gear 66, having gear teeth 68 and which is disposed in meshing engagement with the idler gear teeth 50 for transmitting motive power from the drive gear 44, and thus from the rack gear 30, to the print wheel 60. As thus constructed and arranged, the printing fonts 64 are respectively movable, under the control of the control system 24, in response to translation of the rack gear 30, to a printing position 76 located externally of the postage printing drum 18 for printing purposes.

Figure 2:
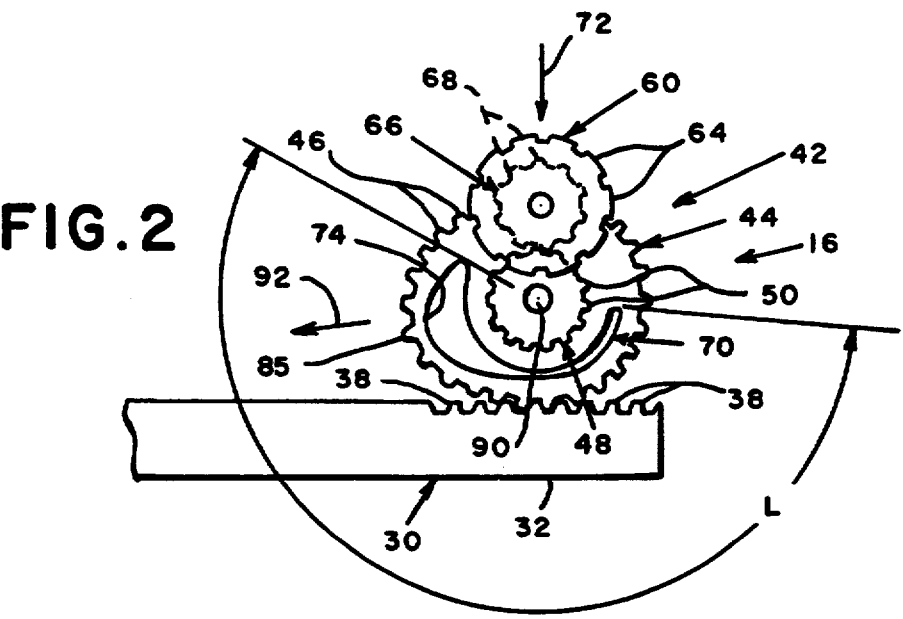
FIG. 2 is a side view of the value selection rack gear, print wheel and drive train of FIG. 1, wherein the print wheel drive gear has been distored in response to a force applied to the print wheel.

According to the invention the postage value selection structure 16 (FIG. 1) preferably includes structure 70 for weakening the drive gear 44 against the application of a force 72 exerted against the print wheel 60 which tends to disassociate the print wheel 60 and idler gear teeth 50 and thus the drive gear 44. And, more particularly, the value selection structure 16 includes an arcuately-extending aperture 74 formed in the drive gear 44 for weakening the strength of the drive gear 44 against the application of a force 72 against the print wheel 60 which might otherwise disassociate the print wheel 60 and drive gear 44, to cause the drive gear 44 to distort against rotation thereof as shown in FIG. 2 in response to the force 72, whereby the drive gear 44 become jammed in response to rotation by the rack gear 30. Preferably, in the course of manufacture of the value printing and selecting structures, 14 and 16, the midpoint 75 between the ends of the arcuately-extending length "L" of the aperture 74 is located in alignment with the printing position 76 of the print wheel's printing fonts 64 when the midpoint between the ends of the array of printing fonts 64, i.e., midway between the fonts 64 having the numerals 4 and 5, is located substantially in alignment with the font printing position 76. Moreover, the overall arcuately-extending length "L" of the aperture 74 is preferably substantially longer than the circumferentially-extending length of the outer periphery of the print wheel 60, so as to answer that the drive wheel 44 distorts in response to the force 72 independently of the peripheral positioning of print wheel's printing fonts 64. In practice, the relative dimensions of the print wheel 60 and drive gear 44 are such that the arcuately-extending length "L" of the aperture 74 is substantially two hundred and four degrees (204°).

As shown in FIG. 2, upon application of the force 72, the drive gear 44 is distorted, as by bending, in a manner such that the aperture 74 is enlarged due to an arcuately-extending portion 85 of the drive gear 44 between the gear teeth 46 and aperture 74 bulging away from the axis 90 of rotation of the drive gear 44, as indicated by the arrow 92. As a result, when the rack gear 30 drives and thereby attempts to rotate the print wheel drive gear 44, the drive gear 44 becomes jammed against the rack gear 30 and the idler gear 48 becomes jammed against the print wheel idler gear 66.

Figure 3:
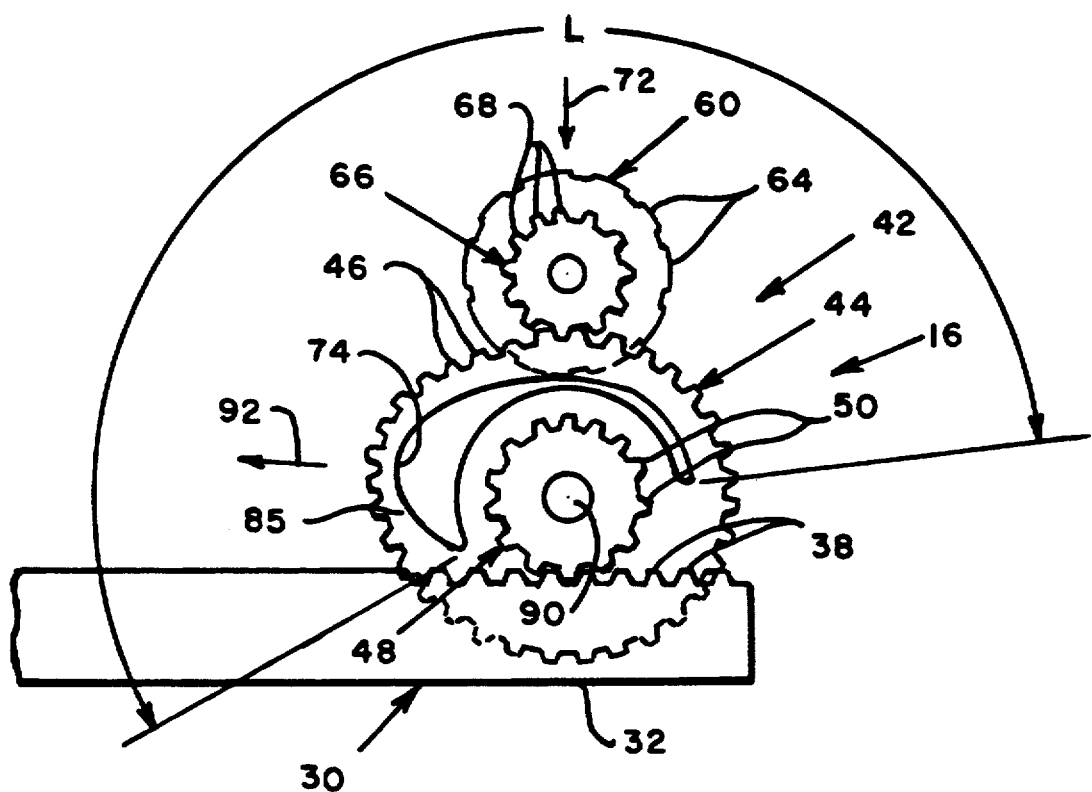
FIG. 3 is a side view of a second embodiment of a rotary postage printing device, similar to FIG. 1, wherein the first idler gear is a pinion gear and is disposed in meshing engagement with the rack gear, wherein the drive gear is disposed in meshing engagement with the second idler gear for rotation of the print wheel, and, as in FIG. 2, wherein the drive gear has been distorted in response to a force applied to the print wheel.

As shown in FIG. 3, a second embodiment of the postage value selection structure 16 of FIGS. 1 and 2, differs therefrom in that the first idler gear 48 (FIGS. 1 and 2) is a pinion gear 48 (FIG. 3) which is conventionally coaxially fixedly attached to the drive gear 44 for rotation thereof and is conventionally disposed in meshing engagement with the rack gear 30 for rotation thereby. In addition the drive gear 44 is conventionally disposed in meshing engagement with the second idler 66 for driving the second idler gear 66 and thus the print wheel. And the midpoint 75 between the ends of the arcuately-extending length "L" of the aperture 74 formed in the drive gear 44 is located between the upper quadrants of the drive gear 44 when the drive gear 44 is disposed in alignment with the font printing position 76, whereas in the embodiment shown in FIGS. 1 and 2, the aperture midpoint 75 is located between the lower two quadrants of the drive gear 44 when drive is disposed in alignment with the font printing position 76.

What is claimed is:

1. Value selection and printing apparatus comprising:
   a. means for printing a value, the printing means including a rotatable device and a drive shaft therefor;
   b. means for selecting the value, the value selecting means including a rack gear slidably movably connected to the device, the rack gear including a plurality of gear teeth formed therein;
   c. the value selecting means including a drive gear and a first gear, the drive gear including gear teeth disposed in meshing engagement with the rack gear teeth, the first gear coaxially fixedly attached to the drive gear for rotation therewith and including first gear teeth;
   d. the value selecting means including a value printing wheel, the printing wheel including a circumferentially-extending periphery and a plurality of printing fonts located at spaced intervals thereabout, the value selecting means including a second gear coaxially fixedly attached to the printing wheel for rotation thereof, the second gear including gear teeth and disposed in meshing engagement with the first gear for rotation of the second gear and thus the print wheel in response to movement of the rack gear; and
   e. means for weakening the drive gear against a force exerted against the print wheel which tends to disassociate the print wheel and second gear to cause the drive gear to distort in response to the force in a manner such that the drive gear jams in response to attempted rotation thereof while the force is applied.

2. The apparatus according to claim 1, wherein the weakening means includes an arcuately-extending aperture formed in the print gear.

3. The apparatus according to claim 2, wherein the second gear includes an outer periphery having a circumferentially-extending length, and the aperture has an arcuately-extending length substantially greater than the length of the periphery of the second gear.

4. The apparatus according to claim 3, wherein the respective printing fonts are selectively movable to a printing position thereof, the printing fonts collectively including a midpoint, the aperture including a midpoint disposed substantially in alignment with the printing position when the print wheel is located such that the midpoint thereof is located substantially in alignment with the printing position.

5. The apparatus according to claim 1, wherein the drive gear has an axis of rotation, the drive gear Weakening means including an arcuately-extending aperture, the drive gear including an arcuately-extending portion thereof between the aperture and a plurality of the gear teeth thereof, and the drive gear portion tending to bulge away from the axis of rotation of the drive gear in response to application of the force.

6. The apparatus according to claim 1, wherein the weakening means includes an arcuately-shaped portion of the drive gear, and the manner of distortion of the drive gear includes the arcuately-shaped portion thereof bulging outwardly of the axis of the drive gear.

7. Value selection and printing apparatus comprising:
   a. means for printing a value, the printing means including a rotatable device and a drive shaft therefor;
   b. means for selecting the value, the value selecting means including a rack gear slidably movably connected to the device, the rack gear including a plurality of gear teeth formed therein;
   c. the value selecting means including a drive gear and a first gear, the first gear coaxially fixedly attached to the drive gear for rotation thereof and including first gear teeth, the first gear disposed in meshing engagement with the rack gear for rotation thereby;
   d. the value selecting means including a value printing wheel, the printing wheel including a circumferentially-extending periphery and a plurality of printing fonts located at spaced thereabout, the value selecting means intervals including a second gear coaxially fixedly attached to the printing wheel for rotation thereof, the second gear including gear teeth and disposed in meshing engagement with the drive gear for rotation of the second gear and thus the print wheel in response to movement of the rack gear; and
   e. means for weakening the drive gear against a force exerted against the print wheel which tends to disassociate the print wheel and second gear to cause the drive gear to distort in response to the force in a manner such that the drive gear jams in response to attempted rotation thereof while the force is applied.

8. The apparatus according to claim 7, wherein the weakening means includes an arcuately-extending aperture formed in the print gear.

9. The apparatus according to claim 8, wherein the second gear includes an outer periphery having a circumferentially-extending length, and the aperture has an arcuately-extending length substantially greater than the length of the periphery of the second gear.

10. The apparatus according to claim 9, wherein the respective printing fonts are selectively movable to a printing position thereof, the printing fonts collectively including a midpoint, the aperture including a midpoint disposed substantially in alignment with the printing position when the print wheel is located such that the midpoint thereof is located substantially in alignment with the printing position.

11. The apparatus according to claim 7, wherein the drive gear has an axis of rotation, the drive gear weakening means including an arcuately-extending aperture, the drive gear including an arcuately-extending portion thereof between the aperture and a plurality of the gear teeth thereof, and the drive gear portion tending to bulge away from the axis of rotation of the drive gear in response to application of the force.

12. The apparatus according to claim 7, wherein the weakening means includes an arcuately-shaped portion of the drive gear, and the manner of distortion of the drive gear includes the arcuately-shaped portion thereof bulging outwardly of the axis of the drive gear.

* * * * *